F. H. FOX.
ANTISKID CHAIN.
APPLICATION FILED AUG. 20, 1910.
1,010,885. Patented Dec. 5, 1911.
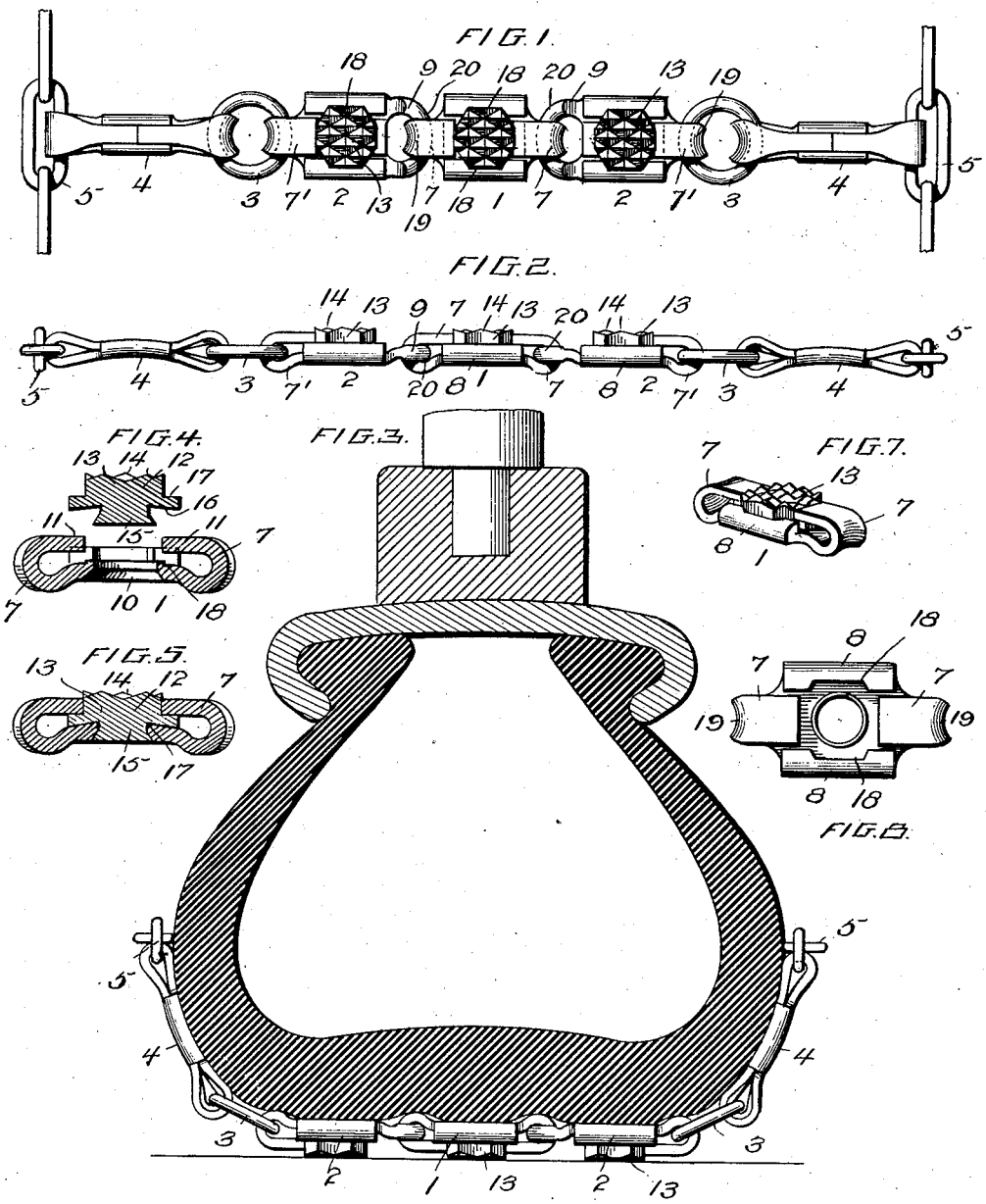
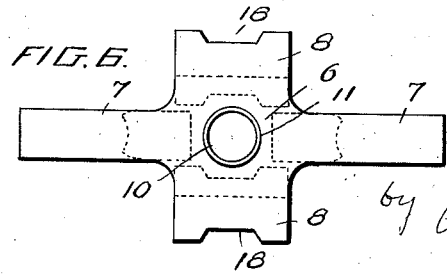
WITNESSES:
INVENTOR
Floyd H. Fox.
Attorney

UNITED STATES PATENT OFFICE.

FLOYD HENRY FOX, OF NEW YORK, N. Y.

ANTISKID-CHAIN.

1,010,885.  Specification of Letters Patent.  Patented Dec. 5, 1911.

Application filed August 20, 1910. Serial No. 578,147.

*To all whom it may concern:*

Be it known that I, FLOYD HENRY FOX, a citizen of the United States, residing at New York city, in the county of New York, State of New York, have invented certain new and useful Improvements in Antiskid-Chains, of which the following is a description, reference being had to the accompanying drawings, forming a part hereof.

My invention relates to antiskid chains for use on tires of automobiles and other vehicles and relates particularly to the construction of the cross chains for such a device.

My invention has for its object to provide a cross chain which, while having ample strength, shall be comparatively light and shall be readily flexible and in which the parts shall be subject to the least wear possible.

A further object of the invention is to provide a link for such a chain provided with a bearing stud which shall be firmly held to the link and in which the link will be protected against wear by the bearing stud.

With these and other objects hereinafter explained in view my invention consists in the construction and combination of elements hereinafter described and claimed.

Referring to the drawings: Figure 1 is a plan view of a cross chain embodying my invention; Fig. 2 is a side view of the same; Fig. 3 is a cross sectional view of an automobile tire showing the cross chain applied thereto; Fig. 4 is a longitudinal section of the center link and the bearing stud showing them ready to be united; Fig. 5 is a similar cross sectional view showing the bearing stud and link united; Fig. 6 is a plan view of the blank from which the center link is formed; Fig. 7 is a perspective view of the center link and bearing stud, and Fig. 8 is a plan view of the center link without the bearing stud.

The cross chain as shown in the drawings comprises a center link 1, side links 2, 2, rings 3, 3 and hooks or connecting devices 4, 4, for connecting the cross chain with the side chains 5, 5. The center link is formed from the blank shown in Fig. 6 which is punched or cut from plate metal of suitable thickness, and comprises a central body portion 6 having a tongue 7 at each end and side wings 8. The side links each have a body portion corresponding to the body portion 6 of the center link but having a tongue 7' at one end only and an eye 9 at the other end. In the completed chain the tongues 7 of the center link engage the eyes 9 of the side links on either side of the center link and the tongues 7 of the side links each engages a ring 3. The body portion 6 of the center link and the body portions of the side links are each provided with a circular opening 10 which is formed by punching through from the under side of the link in such a manner as to leave a bur or ring 11 of metal about the edge of the opening.

12 is the bearing stud comprising a head 13 preferably having its top surface formed with projections 14 in order to secure a better hold on the pavement or ground than would be secured by a plain surface. On the base of the head 13 is formed a downwardly extending projection 15 frusto-conical in form with the base downward so as to form a neck between it and the base of the head. The base of the head surrounding the upper end of the projection 15 is preferably under cut so as to form a shoulder 16 higher at its inner edge than at its outer edge. At opposite points the upper end of the head 13 is cut away to form shoulders 17. The bearing stud is formed of relatively high carbon steel while the link is formed from relatively low carbon steel.

In securing the bearing stud to the link the end of projection 15 is pushed through the opening 10 which is of a diameter just sufficient to receive the lower end of the projection and the link and bearing stud are then forced together by heavy pressure. This causes the bur or ring 11 to flow into the neck formed between the projection 15 and the shoulder 16, this flowing of the metal being facilitated by the inclination of the shoulder. The bearing stud being of relatively hard steel no effect will be produced upon it by pressure sufficient to cause the necessary flowing of the comparatively soft metal of the link.

The wings 8 are formed with recesses 18 in their edges and in the completed link these edges are turned upward and inward against the sides of the bearing stud, the bearing stud fitting into the recesses 18 and being held by the ends of the recesses, from rotation relative to the link. By reason of the recesses in the side edges 8 the links may be made considerably narrower without reducing the size of the head of the bearing stud and without materially lessening the strength of the link.

The edges 9 of the side links are curved at 20 on the arc of a circle so as to present a curved surface on which the tongues 7 of the center link, and the ring 3, may swing readily and the portion 19 of the tongue 8 which bears against the interior of the edge 9 or the ring 3 is also formed on an arc corresponding to that of the edge 9 and ring 3. By reason of this construction the chain may be readily flexed sidewise without undue wear on the edge or tongue. The edge 9 is also preferably swaged or otherwise made circular in cross-section throughout the portion 20 which engages the tongue 8 so as to fit loosely the curve of the tongue.

When the chain is assembled the tongues 8 are bent slightly downward from the body portion of the link and are then curved upward and inward so that their ends rest upon the shoulders 17 of the bearing stud, with the outer surfaces of the ends below the outer face of the head. The wings 8 are bent upward and inward on a curve so as not to present sharp edges which might cut the tire.

The hook or connecting device 4 as here shown consists of a strip of metal having midway of its length side wings 21 and having its ends bent to form hooks or loops 22 and 23 to engage the ring 3 and the chain 5 the ends 24 of the strip being bent into contact with the middle portion of the strip and the wings 21 being bent upward into engagement with the sides of the ends. The hook or loop 22 which engages the ring 3 is preferably curved as shown at 25 so as to swing readily on the inner surface of the ring.

It will of course be understood that if desired more links may be employed than the three shown and described and the links may be connected to the side chains by other means than the rings and hooks shown, and it will be further understood that I do not desire to be limited to precise features of form or construction shown.

Having thus described my invention, what I claim is:

1. A cross chain of an antiskid device for tires, having therein a link comprising a body portion having an opening therein and side wings bent upward and inward, and a bearing stud comprising a head having its sides bearing against the side wings and having at its lower end a projection extending into and secured in the opening in the body portion of the link, the end of said projection being flush with the lower face of the central portion of the link, the bearing stud also having a shoulder formed in its head and a tongue on the body portion of the link curved downward below the plane of the central portion of the link and then upward and inward to form a loop, with its end resting on the shoulder formed on the head of the bearing stud.

2. In a cross chain for an antiskid device for tires, a link comprising a body portion having an opening therein and side wings bent upward and inward and having recesses formed therein, and a bearing stud comprising a head extending into the recesses in the wings and having at its lower end a projection extending into and secured in the opening in the body portion of the link.

3. In a cross chain for an antiskid device for tires, a link comprising a body portion having an opening therein and having a tongue adapted to engage an eye or ring, and a bearing stud extending into and secured in the opening in the body portion, and having a shoulder formed therein near its outer end, the end of the tongue being bent slightly downward, upward and inward with its end resting on the shoulder of the bearing stud.

This specification signed and witnessed this 18th day of August A. D. 1910.

FLOYD HENRY FOX.

In the presence of—
 JAMES B. MOTT,
 A. E. DAVISON.